United States Patent [19]

Cornet et al.

[11] Patent Number: 4,551,733
[45] Date of Patent: Nov. 5, 1985

[54] PROTECTED OPTICAL DISC COMPRISING A FLEXIBLE CLOSURE ELEMENT

[75] Inventors: Jean Cornet; Francois Langé; Francois Le Carvennec; Jean-Claude Lehureau; Roger Rascle, all of Paris, France

[73] Assignee: Thomson CSF, Paris, France

[21] Appl. No.: 474,452

[22] Filed: Mar. 11, 1983

[30] Foreign Application Priority Data

Mar. 23, 1982 [FR] France .................. 82 04913

[51] Int. Cl.⁴ .......................................... G01D 15/32
[52] U.S. Cl. ..................................... 346/137; 369/284
[58] Field of Search ............... 346/137, 135.1, 76 L; 369/284, 286, 282

[56] References Cited

U.S. PATENT DOCUMENTS

| | | | |
|---|---|---|---|
| 4,038,663 | 7/1977 | Day | 346/137 X |
| 4,264,911 | 4/1981 | Wilkinson | 346/137 X |
| 4,308,545 | 12/1981 | Lehureau | 346/137 X |

FOREIGN PATENT DOCUMENTS 54-139702 10/1979 Japan .................. 369/284
7900205 1/1979 Netherlands .

OTHER PUBLICATIONS

Patent Abstracts of Japan, vol. 5, No. 150, Sep. 22, 1981, p. 146P81-56-83852, 56-83851.

Primary Examiner—Joseph W. Hartary
Attorney, Agent, or Firm—Cushman, Darby & Cushman

[57] ABSTRACT

A protected optical disc adapted for optical recording and playback of information (particularly digital recording) with a rigid element carrying the recording surface, and a flexible element permeable to optical radiation, one of these two elements having the shape of a dish. At least one of the elements is provided with a central hole for receiving a driving shaft, with the joined annular portion or portions of the two elements concentric with the central hole.

8 Claims, 6 Drawing Figures

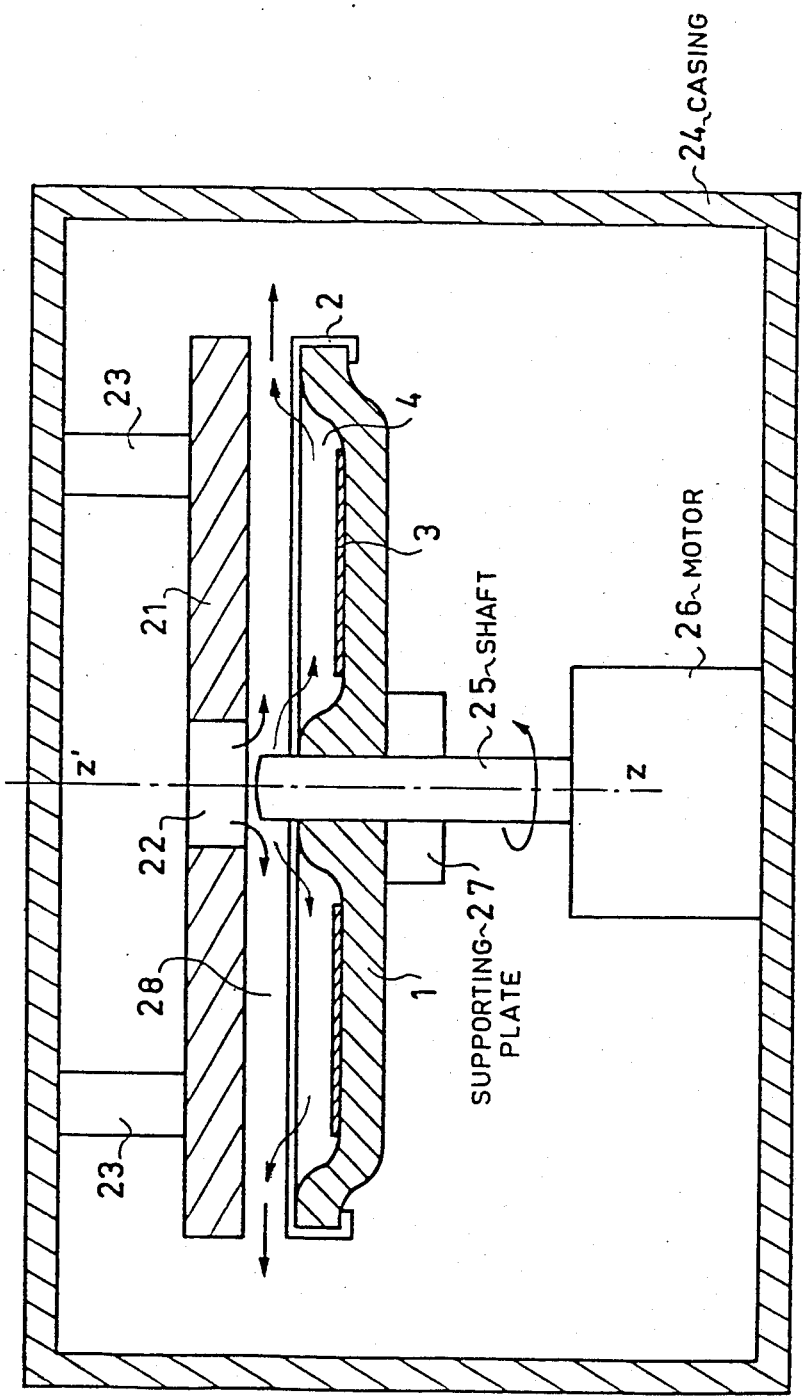

PROTECTED OPTICAL DISC COMPRISING A FLEXIBLE CLOSURE ELEMENT

The present invention relates to a protected optical disc intended for recording information, in a recording layer formed of a material sensitive to radiation.

BACKGROUND OF THE INVENTION

The record made of the information in the recording layer commonly appears in the form of surface irregularities on the order of one micron. The operations for the production of optical discs, whether prerecorded or blank, are performed in a dustfree atmosphere with numerous precautions to prevent any deterioration of the carrier or of the sensitive layer. It is while the disc is being used by a user that deteriorations may occur, as well as while it is being stored. Consequently, it is desirable to protect the recording surface against anything which could cause damage to the same: dust, fingerprints, placing the heat-sensitive layer in contact with objects able to spoil or scratch the same. The system for protection of an optical disc should also permit easy and frequent handling by a user.

It is known that sensitive layers used to record data may be deposited on a rigid carrier and protected by means of a rigid plate of a thickness close to one millimeter maintained at a particular distance from the carrier by means of spacers. The major disadvantage of this structure derives from the assembling of the four elements forming the same: the rigid carrier, the rigid protective plate and the two circular spacers. In particular, the peripheral spacer raises a serious problem regarding centering since it has no contact surface at all with the centering spindle, in contrast with the three other elements. The speed of revolution of an optical disc being on the order of 1500 r.p.m., any faulty balancing causes the production of appreciable centrifugal forces and the occurrence of vibrations prejudicial to a correct operation of the system.

Consequently, it has been attempted to avoid the necessity of spacers and to simplify the assembly of the protected disc by means of a preformed rigid protective cover or lid bonded to a rigid carrier transparent to the radiation, the sensitive layer being deposited on this carrier. Although this resolves the disc balancing problem, another problem arises in view of recording and playback through the rigid carrier. In effect, the variations in thickness occurring in this approach on one disc, or from one disc to another, result in optical aberrations modify the energy distribution within the optical spot focussed on the sensitive layer thereby impairing the quality or reproducibility of the recording. On the other hand, sensitive structures of the triple layer type cannot be recorded acceptably through the substrate.

In order to overcome these shortcomings, the present invention makes an optical disc from a rigid carrier which is deposited on a sensitive layer, and from a thin element providing access for the playback beam, the rigid carrier and/or the transparent cover being preformed in such a manner as to delimit an annular chamber above the sensitive layer without the necessity of inset spacers.

SUMMARY OF THE INVENTION

The invention consequently provides a protected optical disc adapted to record information thereon, comprising a rigid element carrying at least one recording surface, and a flexible element providing access for optical playback and/or recording radiation to said recording surface, said elements (or the rigid elements alone) comprising a central hole which permits the passing of a driving spindle, and delimiting an annular chamber enclosing said recording surface, wherein the junction between the flexible element and the rigid element is formed along two co-planar annular surfaces delimiting said annular chamber, said surfaces being concentric with respect to said central hole, at least one of the said elements being preformed in the shape of an annular dish of which the inner and outer rims form the junction with the other of said elements, and said preforming operation maintaining the concentricity of this element with respect to said central hole.

The invention also provides a system for playback and/or recording of a protected optical disc, wherein it comprises a fixed disc-cover placed opposite to said flexible element, said disc-cover and said optical disc delimiting an air cushion and playing a part in creating a negative pressure within this air cushion when the disc is driven in a rotary displacement, said disc-cover providing for access of said optical radiation to said recording surface.

BRIEF DESCRIPTION OF THE DRAWINGS

The invention will now be further described, by way of example, with reference to the accompanying drawings, in which:

FIG. 6 is a cross-sectional view of a system for recording or playback of a protected optical disc and comprising a disc-cover.

DESCRIPTION OF THE PREFERRED EMBODIMENTS

Figure 1:
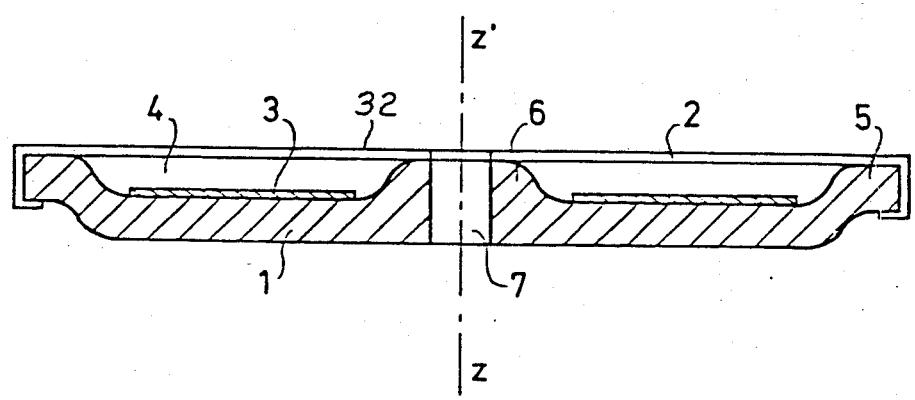
FIG. 1 is a cross-sectional view of one embodiment of protected optical disc according to the invention.

FIG. 1 is a cross-sectional view of one embodiment of an optical disc protected in accordance with the invention and operated by reflection. It comprises a circular and preformed rigid element 1. This element may consist of any material providing the disc with satisfactory stiffness. This stiffness may be provided mainly by sufficient thickness of the element 1 in the case of the same manufactured from a plastics material like polyvinyl chloride. If the element 1 is of metal, for example of aluminium, its very character assures disc rigidity and its thickness may be of the order of one millimeter. The rigid element 1 is inteneded to receive the sensitive layer forming the recording surface 3. To assure satisfactory flatness of the surface of the rigid element carrying the sensitive layer, a burnished finish may be produced on this surface before depositing the sensitive layer. The sensitive layer 3 may consist a layer degraded by heat at low temperature of the order of 100° to 150° C., and deposited by centrifuging and evaporation. As is apparent from FIG. 1, the rigid element 1 has the form of a dish having circular rims 5 and 6 whose axes of revolution coincide with the axis of revolution zz' of the element 1. The recording surface is consequently situated in the bottom of the dish formed by the element 1 which has a hole 7 for traversal by a driving spindle. To protect the layer 3, the element 1 is covered with the flexible element 2 secured on the rims 5 and 6. The upper surfaces of the rims 5 and 6 are situated in a common plane, this plane being parallel to the plane of the recording surface, and thereby form two annular surfaces providing the junction between the elements 1 and 2. The element 2 may also be pierced by a central hole for traversal by the driving spindle, if need be. The elements 1 and 2 delimit an annular chamber 4 above the recording surface 3.

One of the features of the invention is that the optical playback and/or recording radiation reaches the recording surface 3 while passing through the element 2. The latter should consequently be transparent to the optical radiation and should not distort the radiation. However, plastic films are obtained as a rule by extrusion and rolling, and are consequently highly birefringent. To prevent causing substantial interference with the optical radiation by these birefringent effects, it is assumed that the element 2 should cause an operational difference $e.\Delta n \leq \lambda/10$, e being the thickness of the element 2, $\Delta n$ the birefringence and $\lambda$ the wavelength of the optical radiation. For example, use may be made of a rolled sheet of polyvinyl chloride having a gauge of 0.2 mm, which is tensioned lightly and sealed or secured by heat-welding on the rims 5 and 6 of the element 1 and having a birefringence of $4 \times 10^{-4}$. The distance separating the recording surface from the flexible element 2 is of the order of 1 mm. Due to its small thickness and flexibility, the element 2 does not affect the rigidity of the element 1. On the other hand, there is no harmful action on the disc during rotation, since it does not give rise to any appreciable imbalance, given its small weight. It is considered, on the other hand, that the deformation of this flexible element 2 deriving from possible changes in gas pressure within the annular space has no appreciable effect on the optical playback or recording radiation given the small thickness of this element 2.

Another advantage of the thin film is that lenses having a short frontal extension may be utilised to focus the optical radiation. As a matter of fact, because of the small thickness of the element 2, the recording surface may be placed at a small distance from the lens front. This saves the lens from having an excessive weight and facilitates its control to the course followed by the data recorded on the disc. The short front spacing equally prevents other harmful phenomena such as spherical aberration and astigmatism if the optical radiation is oblique.

Upon securing the flexible element 2 on the rigid element 1, it is able to provide excellent sealing for the annular chamber 4 at the center as well as at the periphery. If this condition cannot be fulfilled, the sealing effect should be more pronounced at the periphery than at the centre. This is another consequence of the centrifugal forces caused by the rotation of the disc, which tends to expel the air from the annular chamber via the periphery of the disc. If the air becomes rarefied within the annular chamber, the flexible film 2 will tend to come into contact with the recording surface. To prevent this action, the peripheral leaks should be limited and the air expelled should be replenished by means of air entering at the center of the disc. Since the external diameter of the chamber 4 is much greater than its internal diameter, the sealing of the film 2 on the rim 5 should be more carefully carried out than on the rim 6. As shown in FIG. 1, the film may be secured over a greater area on the rim 5 than on the rim 6.

The external surface of the film should undergo a hardening treatment to prevent scratching of the flexible film. An anti-scratch coating of polysiloxane is perfectly suitable and does not impair the optical properties of the flexible element.

Figure 2:
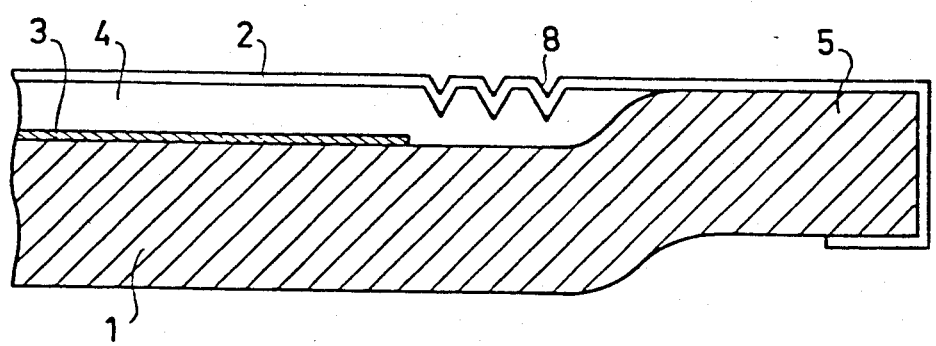
FIG. 2 is a partial cross-sectional view of another embodiment of protected optical disc according to the invention.

In the case in which the structure is not sealed, and in order to provide the element 2 with greater flexibility, folding or creasing of the film may be effected, for example in an area situated closer to the periphery of the disc and beyond the path of the optical playback or recording radiation. The film will consequently have an annular peripheral area resembling the diaphragm of certain loudspeakers, all the proportions being retained. FIG. 2 is a partial view in cross-section of an optical disc in which the flexible element has an annular creasing area formed by creases or folds 8.

Figure 3:
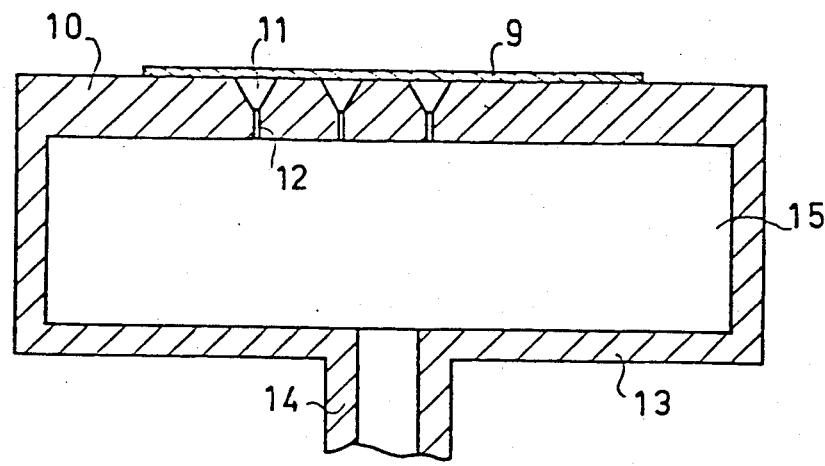
FIG. 3 is a cross-sectional view of a folding device for a flexible element.
Figure 4:
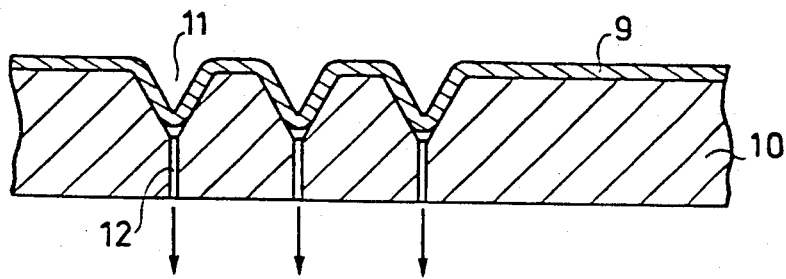
FIG. 4 is an explanatory view of the utilisation of a folding device.

FIG. 3 is a view in cross-section of a device intended to form folds in a flexible film. This device comprises a box 13 enclosing a volume of air 15 which is joined via a tube 14 to a vacuum pump which is not illustrated. The upper surface 10 of the box is arranged to be heatable and is provided with grooves 11 connected to the chamber 15 via holes 12. The film 9 which is to be deformed is laid over the surface 10, which makes it more pliable by heating action. When the vacuum pump comes into operation, the film is deformed and is applied against the walls of the grooves 11. This is illustrated by FIG. 4 which is an enlargement of a part of FIG. 3. The arrows extending from the holes 12 represent the induction of the air by the vacuum pump. The heating action on the surface 10 is then stopped and, when the film has cooled sufficiently, the chamber 15 is filled with air and a film deformed at the grooves is obtained.

Figure 5:
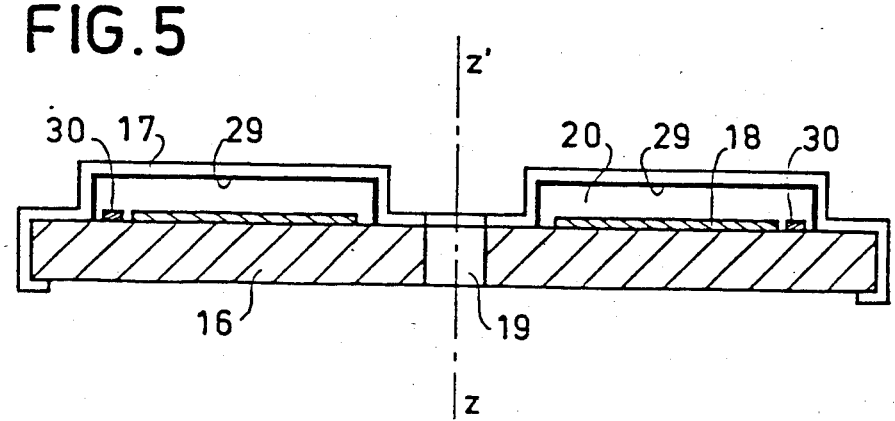
FIG. 5 is a modified form of a protected optical disc according to the invention.

In the preceding embodiment, it was the rigid element which formed the dish, but a protected optical disc may be produced in which it is the flexible element which acts as a dish. This is shown in FIG. 5, which illustrates a further embodiment of a protected optical disc in accordance with the invention. The rigid element is formed by a flat disc 16 pierced by a central hole 19 and carrying an annular sensitive layer 18. The flexible element 17 has been preformed and has the appearance of a dish or cowling, its thickness may be up to 0.5 mm. It may possibly be pierced by a hole of the same size as that of the rigid element. The axes of these holes, which are traversed by the driving spindle, coincide with the symmetry axis zz' of the disc. The flexible element 17 acting as a cover may be folded under the rigid element 16 as is apparent from FIG. 5. If a very efficient peripheral sealing effect on the annular chamber is required, the cover may be sealed or secured by heat-welding. More satisfactory sealing may be assured at the periphery of the disc than at its center, as a function of the magnitude of the surfaces bonded or welded at the periphery or to the center of the disc and of the care devoted to this task. In the examples disclosed by FIGS. 1 to 5, it is possible if it is desirable to have an air flow from the center towards the periphery of the disc during its rotation, to leave the flexible element unconnected to the periphery of the disc and to provide small holes for passage of air to its center. In this case, the speed of rotation of the disc plays a part in slightly lifting the flexible element off the periphery of the disc and permits an air flow from the center to the external rim of the disc. As in the preceding example, the flexible element may undergo a treatment for hardening its external surface and may comprise a folded area.

The flexible element is comparatively thin in both examples, which may entail a particular permeability with respect to humidity which may impair the thermosensitive layer by precipitation of water droplets and oxidisation of the layer. To eliminate these shortcomings, it is within the scope of the invention to line the internal surface of the flexible element with a humidity barrier coating. This coating should be transparent to the optical playback or recording radiation any may be formed by a thin skin of gold, platinum, palladiaum or of an alloy based on these elements. To counteract the oxidisation of the thermosensitive layer, an easily oxidisable material acting as a getter may be installed within the annular chamber at points situated outside the path of the optical radiation. This material may be a more electropositive metal than the metal layer carrying the thermo-degradable layer, for example zinc or manganese, deposited by means of an electrochemical process or by evaporation. Use may equally be made of an organic layer containing a suspension of particles of metal or of unsaturated metal oxides, for example a red lead oxide paint.

In FIG. 5, the symbols 29 and 30 respectively denote the humidity barrier coating and the easily oxidisable material arranged in a ring concentric to the central hole.

No matter which element is dish shape, the optical disc of the invention may be placed under a disc cover which remains fixed during the rotation of the disc. This disc cover, apart from providing a mechanical protection for the disc, prevents the flexible element coming into contact with the sensitive layer during its utilisation, for example if the seal at the outside of the disc were to be inadequate. The effect sought consists in creating a negative pressure in the space comprised between the protected disc and the disc cover which prevents the flexible element from sticking against the sensitive layer.

FIG. 6 is a cross-sectional view of a system according to the invention for playback or recording for a protected optical disc, and comprising a disc cover. This figure shows a playback system secured on a casing 24 and a motor 26 transmitting drive via a spindle 25 to a protected optical disc resting on a plate 27 fixed to the spindle 25. The protected disc shown is that of FIG. 1 but the system including a disc cover may make use of protected optical discs such as that illustrated in FIG. 5. The disc is topped by a disc cover 21 secured to the casing 24 by means of elements 23 which provide an air passage between the disc cover and the casing 24. The disc cover is positioned parallel to the protected disc. It has a circular shape and its symmetry axis coincides with the axis zz' which also forms the symmetry axis of the spindle 25, of the plate 27 and of the optical disc. The thickness of the air cushion 28 separating the disc from the disc cover may be up to a few millimeters. The disc cover has a central hole 22. When the system is in operation, the rotation of the disc causes displacements within the mass of the air, which tend to expel the air in an outward direction. An air flow consequently occurs in the space comprised between the disc and the disc cover, the hole 22 being the airflow intake and the periphery of the air cushion its outlet along the arrows situated in FIG. 6. The air intake area being smaller than its outlet area, the air pressure between the disc and the disc cover is lower within a volume close to the middle of the recording surface 3 than at the level of the spindle 25. A negative pressure is consequently built up in the part of the air cushion 28 situated above the recording surface which prevents the flexible element 2 from coming into contact with the the recording surface. To provide access for the optical radiation, the disc cover 21 should be equipped with a slot situated along the radius of the disc and sufficiently wide to permit passage of the lens providing focussing of the optical radiation.

A modified form of disc cover comprises a plate installed in the same manner as the disc cover 21 but lacking a central hole. In this case, it is only the action of centrifugal force which provides for a depressurisation of the air cushion 28 during the rotation of the disc. This situation is encountered, for example when the disc is placed in a cassette having the main function of easing the handling of the disc and of providing total mechanical protection. In this case, the function of a disc cover may be fulfilled by the wall of the cassette opposite to the flexible element.

The production of discs for playback on both their surfaces by means of a symmetrical arrangement with respect to the central plane of the rigid element, equally lies within the scope of the invention.

The invention makes it possible to produce protected optical discs which do not require spacers and are simple and inexpensive to produce. The protective element permits passage without impediment of playback or recording radiation, thereby contributing to its satisfactory focussing or the sensitive layer.

We claim:
1. An optical disc and disc-drive device for use with an optical beam apparatus comprising:
   a drive motor with a drive shaft;
   a supporting element having a center hole for receiving said drive shaft, and having two annular raised portions of said element, one of which is concentric and adjacent to said center hole and the other of which is concentric and adjacent the periphery of said element, and having an annular depressed portion between said raised portions;
   means defining an annular recording surface deposited on said supporting element in said depressed portion;
   a protective flexible layer permeable to optical beams from said optical beam apparatus, and supported on raised portions of said element so as to form an annular chamber between said element and said layer, said recording surface being contained therein;
   stationary disc cover means mounted parallel to said supporting element having a hole coaxial with but larger than said drive shaft and having portions permeable to said optical beams; and
   a gas chamber defined by a space betwen said disc cover and said flexible layer so that rotation of said disc causes centrifugal force on gas in said gas chamber to push the same radially outward away from said coaxial hole and thereby draw gas through said coaxial hole into said gas chamber, wherein negative pressure thereby created in said gas chamber draws said flexible layer upward to prevent the flexible layer from contacting said recording surface.

2. A disc and device as in claim 1, wherein said flexible layer is comprised of plastic material with thickness and birefringence thereof defined by: $(e)\Delta n \leq \lambda/10$, where e=the thickness of said flexible layer, $\Delta n$=the birefringence of said flexible layer and $\lambda$=the wavelength of light of an optical beam from said apparatus.

3. A disc and device as in claim 1, wherein said supporting element is comprised of a metallic substance.

4. A disc and device as in claim 3, wherein said metallic substance is aluminum.

5. A disc and device as in claim 1, wherein said flexible layer is coated on its surface which is exterior to said annular chamber with a scratch-resistant protective layer of material which is permeable to optical beams from said apparatus.

6. A disc and device as in claim 1, wherein said flexible layer is lined on its surface which is interior to said annular chamber with a humidity barrier coating which is permeable to optical beams from said apparatus.

7. A disc and device as in claim 1, wherein said annular chamber also contains therein material which is more readily oxidized than material comprising said recording surface.

8. A disc and device as in claim 1, wherein said protective flexible layer comprises at least one annular corrugation.

* * * * *